(12) United States Patent
Choi et al.

(10) Patent No.: US 12,454,610 B2
(45) Date of Patent: Oct. 28, 2025

(54) VINYL ACETATE-ETHYLENE COPOLYMER EMULSION AND METHOD FOR THE PRODUCTION THEREOF

(71) Applicant: Wacker Chemie AG, Munich (DE)

(72) Inventors: Yong-Hae Choi, Seongnam-si (KR); DaeKyu Kang, Seongnam-si (KR); Jong-Bok Kim, Seongnam-si (KR)

(73) Assignee: Wacker Chemie AG, Munich (DE)

( * ) Notice: Subject to any disclaimer, the term of this patent is extended or adjusted under 35 U.S.C. 154(b) by 877 days.

(21) Appl. No.: 17/613,798

(22) PCT Filed: May 23, 2019

(86) PCT No.: PCT/EP2019/063331
§ 371 (c)(1),
(2) Date: Nov. 23, 2021

(87) PCT Pub. No.: WO2020/233815
PCT Pub. Date: Nov. 26, 2020

(65) Prior Publication Data
US 2022/0227986 A1 Jul. 21, 2022

(51) Int. Cl.
*C08L 31/04* (2006.01)
(52) U.S. Cl.
CPC .................................. *C08L 31/04* (2013.01)
(58) Field of Classification Search
CPC .......... C08L 31/04; C08F 4/40; C08F 210/02; C08F 218/02; C08F 218/08; C08K 2003/2296; C08K 3/22
See application file for complete search history.

(56) References Cited

U.S. PATENT DOCUMENTS

RE28,065 E   7/1974  Beresniewicz

FOREIGN PATENT DOCUMENTS

| CN | 103140514 A | 6/2013 | |
|----|----|----|----|
| CN | 109517102 A * | 3/2019 | ............ C08F 218/08 |
| CN | 109575311 A | 4/2019 | |
| EP | 1201685 B1 | 4/2004 | |
| GB | 1514105 A | 6/1978 | |
| WO | 13160711 A1 | 10/2013 | |
| WO | WO-2016077659 A1 * | 5/2016 | ............ A01N 25/02 |
| WO | WO-2016190740 A1 * | 12/2016 | ............ A23C 19/163 |

OTHER PUBLICATIONS

English translation of CN-109517102-A (Year: 2019).*
New_Handbook_of_Practical_Clinical_Drugs_edited_by_WANG_Qiugan_Guangdong_Science_and_Technology_Press_p. 576_Sep. 2010.

* cited by examiner

*Primary Examiner* — Robert S Jones, Jr.
*Assistant Examiner* — Cullen L G Davidson

(57) ABSTRACT

A vinyl acetate-ethylene copolymer emulsion and method of making the same. The vinyl acetate-ethylene copolymer emulsion is prepared by using a redox initiator. Where the redox initiator includes a salt of at least one metal selected from the group consisting of silver (Ag), platinum (Pt), copper (Cu), mercury (Hg), zinc (Zn), tin (Sn), lead (Pb), bismuth (Bi), cadmium (Cd) and chromium (Cr). The emulsion further includes an oligomer of a monocarboxylic acid selected from the group consisting of $C_1$-$C_{14}$ aliphatic monocarboxylic acid and $C_6$-$C_{14}$ aromatic monocarboxylic acid.

18 Claims, 7 Drawing Sheets

VAE Emulsion of Example 1

VAE Emulsion of Com. Example 1

VAE Emulsion of Com. Example 2

VAE Emulsion of Example 1 | VAE Emulsion of Com. Example 1 | VAE Emulsion of Com. Example 2

VAE Emulsion of Example 1

VAE Emulsion of Example 2

(a) (b)

(a)

Com. Example 1          Example 1

(b)

Com. Example 1          Example 1

(a)

(b)

VINYL ACETATE-ETHYLENE COPOLYMER EMULSION AND METHOD FOR THE PRODUCTION THEREOF

CROSS-REFERENCE TO RELATED APPLICATIONS

This application is a U.S. National Phase application of PCT Application No. PCT/EP2019/063331 filed on May 23, 2019 the disclosure of which is incorporated by reference herein in its entirety.

The present invention relates to a vinyl acetate-ethylene copolymer emulsion and a method for the production thereof and, more particularly, to a vinyl acetate-ethylene copolymer emulsion that exhibits excellent preservability and storage stability even without a separate preservative, and a method for production thereof.

A vinyl acetate-ethylene copolymer emulsion (hereinafter referred to as "VAE emulsion") is used in a broad spectrum of industries relating to paint binders, wood adhesives, carpet back coating, non-woven fabrics, construction (waterproofing agents, adhesion enhancers, primers, etc.), paper coating, etc.

Such VAE emulsions are exposed to the risk of putrefaction because they are prepared by emulsification in water and the final products contain a large quantity of water. Particularly when the seasons change, VAE emulsions are at the higher risk of being putrefied owing to temperature changes.

In order to prevent such putrefaction, conventional ITO (isothiazolinone)-type preservatives, such as 5-chloro-2-methyl-4-isothiazolin-3-one (OMIT), 2-methyl-4-isothiazolin-3-one (MIT), and 1,2-benzisothiazolin-3-one (BIT), are predominantly employed in the VAE emulsion for the reason of efficacy and economic benefits. However, the preservatives are destroyed depending on the polymerization system for VAE emulsions, initiator residues in VAE emulsions, a pH of the products, a storage temperature, a redox potential, etc., which leads to the putrefaction of VAE emulsion products, having influences on the storage stability and quality of the products.

In addition, the abuse of preservatives has recently raised social problems, with the consequent establishment of severer regulations thereagainst.

A purpose of the present invention is to provide a vinyl acetate-ethylene copolymer emulsion that exhibits excellent preservability and product stability even without a separate preservative.

Another purpose of the present invention is to provide a method for preparing a vinyl acetate-ethylene copolymer emulsion that exhibits excellent preservability and product stability even without a separate preservative.

The present invention provides a vinyl acetate-ethylene copolymer emulsion prepared by using a redox initiator, wherein the redox initiator comprises a salt of at least one metal selected from the group consisting of silver (Ag), platinum (Pt), copper (Cu), mercury (Hg), zinc (Zn), tin (Sn), lead (Pb), bismuth (Bi), cadmium (Cd), and chromium (Cr).

In addition, the present invention provides a method for preparing a vinyl acetate-ethylene copolymer emulsion, the method comprising: polymerizing vinyl acetate and ethylene in the presence of a redox initiator in a protective colloid-containing aqueous reaction mixture, wherein the redox initiator include a salt of at least one metal selected from silver (Ag), platinum (Pt), copper (Cu), mercury (Hg), zinc (Zn), tin (Sn), lead (Pb), bismuth (Bi), cadmium (Cd), and chromium (Cr).

According to the present invention, a vinyl acetate-ethylene copolymer emulsion (VAE emulsion) may have excellent preservability and storage stability without a separate preservative.

Below, a detailed description will be given of the present invention.

A vinyl acetate-ethylene copolymer emulsion (VAE emulsion) is prepared by a polymerization reaction of vinyl acetate and ethylene, which is initiated by a redox initiator. Conventionally, an alkali metal salt such as SFS (sodium formaldehyde-sulfoxylate) has been used as a reducing agent in such a redox initiator. However, the VAE emulsion prepared using such reducing agent suffers from the problem of being readily putrefied by fungi. In order to overcome the problem, a preservative such as CMIT, MIT, and BIT, was added to the VAE emulsion after polymerization. However, the preservatives are decomposed by residual initiators, or depending on a pH of the emulsion, during storage, thereby lowering the storage stability of the VAE emulsion.

Surprisingly, the present inventors found that when a salt of a metal selected from the group consisting of silver (Ag), platinum (Pt), copper (Cu), mercury (Hg), zinc (Zn), tin (Sn), lead (Pb), bismuth (Si), cadmium (Cd), and chromium (Cr) is used, instead of an alkali metal salt, as a reducing agent in a redox initiator, a metal oxide resulting from the oxidation of the metal salt upon the formation of a vinyl acetate-ethylene copolymer exhibits a preservative effect.

In addition, it was found that the use of $C_1$-$C_{14}$ monocarboxylic acid (e.g., lactic acid), together with the foregoing redox initiator, in polymerization between vinyl acetate and ethylene, further enhances the preservability and storage stability of the vinyl acetate-ethylene copolymer emulsion.

In the present invention, accordingly, a redox initiator containing a salt of at least one metal selected from the group consisting of silver (Ag), platinum (Pt), copper (Cu), mercury (Hg), zinc (Zn), tin (Sn), lead (Pb), bismuth (Bi), cadmium (Cd), and chromium (Cr) is used in preparing a VAE emulsion, whereby a vinyl acetate-ethylene copolymer emulsion (VAE emulsion) having excellent preservability and storage stability can be prepared without using a separate preservative. In addition, the present invention can simplify a preparation process with the resultant reduction of production cost because the preparation of the VAE emulsion requires neither a separate preservative (e.g., MIT, CMIT, BIT, DGH, etc.) nor a storage stabilizer, such as $KIO_3$, to prevent the degradation of preservatives.

According to an embodiment of the present invention, the method for preparing a vinyl acetate-ethylene copolymer emulsion comprises polymerizing vinyl acetate and ethylene in the presence of a redox initiator in a protective colloid-containing aqueous reaction mixture, wherein the redox initiator comprises a salt of at least one metal selected from the group consisting of silver (Ag), platinum (Pt), copper (Cu), mercury (Hg), zinc (Zn), tin (Sn), lead (Pb), bismuth (Bi), cadmium (Cd), and chromium (Cr).

Optionally, the method may further comprise adding a $2^{nd}$ redox initiator identical to or different from the redox initiator to the emulsion containing the vinyl acetate-ethylene copolymer formed in the polymerizing step after completion of the polymerization reaction.

Hereinafter, the method for preparing a vinyl acetate-ethylene copolymer emulsion according to the present invention is described in detail in a stepwise manner.

(1) Polymerization Reaction Step

This step is to polymerize vinyl acetate and ethylene in the presence of a redox initiator in a protective colloid-containing aqueous reaction mixture (hereinafter referred to as "S100 step").

According to an embodiment of the present invention, the S100 step may comprise, but is not limited to, the steps of: (S110) feeding a protective colloid-containing aqueous reaction mixture to a reactor; (S120) feeding vinyl acetate and ethylene to the reactor under a nitrogen atmosphere; (S130) feeding a redox initiator to the reactor of S120 step to initiate a polymerization reaction of vinyl acetate and ethylene; and (S140) feeding vinyl acetate to the reactor of S130 step. Below, each step will be concretely explained.

1) S110 Step

This step is to feed a protective colloid-containing aqueous reaction mixture to a reactor.

The aqueous reaction mixture contains water and a protective colloid, and optionally, at least one selected from the group consisting of a co-emulsifier and a pH adjuster.

So long as it is typically used in preparing a VAE emulsion in the art, any protective colloid may be available in the present invention without particular limitations thereto. Examples of the protective colloid include polyvinyl alcohol; polyvinyl acetal; polyvinylpyrrolidone; cellulose and carboxymethyl-, methyl-, hydroxyethyl-, hydroxypropyl-derivatives thereof; proteins such as casein protein, caseinate, soya protein, gelatin, etc.; polymers, such as poly(meth)acrylic acid, poly(meth)acrylamide, polyvinylsulfonic acid, and water-soluble copolymers thereof; melanin-formaldehyde sulfonate; naphthalene-formaldehyde sulfonate; styrene-maleic acid copolymer, and vinyl ether-maleic acid copolymer, but are not limited thereto. They may be used alone or in combination.

For example, the protective colloid may be polyvinyl alcohol. In this case, the polyvinyl alcohol may be a commercial product having an average degree of polymerization of about 300 to 3,000 with a degree of hydrolysis (degree of saponification) ranging from about 85 mol % to about 98 mol %. In addition, two or more polyvinyl alcohols, which have a difference in degree of polymerization from each other, may be used as a protective colloid. For example, the protective colloid may comprise the $1^{st}$ polyvinyl alcohol having a degree of hydrolysis of about 85 mol % to about 90 mol % with a degree of polymerization ranging about 300 to about 600 and the $2^{nd}$ polyvinyl alcohol having a degree of hydrolysis of 85 mol % to 90 mol % with a degree of polymerization ranging from about 1800 to about 2600. In this regard, the $1^{st}$ polyvinyl alcohol and the $2^{nd}$ polyvinyl alcohol may be contained at a weight ratio of 10:90 to 90:10.

The content of the protective colloid is not particularly limited and may range from about 3 parts by weight to about 12 parts by weight, based on the 100 parts by weight of a sum of vinyl acetate and ethylene.

Without being particularly limited, the content of water in the aqueous reaction solution may be about 80 times to about 130 times as large as that of the protective colloid.

The time for which the protective colloid and water are mixed together is not particularly limited but may range, for example, from about 10 min to about 30 min and particularly from about 15 min to about 25 min. In addition, when a co-emulsifier and/or a pH adjuster is further added to the aqueous reaction mixture, the mixing time may be adjusted to mix them more homogeneously depending on an amount of the emulsifier and a pH adjuster.

Optionally, the aqueous reaction mixture according to the present invention may further include a co-emulsifier when a VAE emulsion is prepared using the protective colloid. In the case where a co-emulsifier is used in preparing the VAE emulsion, vinyl acetate-ethylene copolymer particles may be dispersed in the form of emulsion particles in a VAE emulsion. In this regard, the emulsion particles are smaller in size (average diameter), with a more uniform particle distribution, compared to a case of using no co-emulsifiers. By adding a co-emulsifier to the aqueous reaction mixture, a VAE emulsion may be prepared that is improved in water resistance, compared to that without co-emulsifiers.

So long as it is generally used in preparing a VAE emulsion in the art, any co-emulsifier may be used in the present invention without particular limitations thereto. For example, the co-emulsifier may be a non-ionic emulsifier such as an alkyl polyglycol ether having 8-40 ethylene oxide units, and alkylaryl polyglycol ether having 8-40 ethylene oxide units; or a cationic emulsifier such as an alkoxylated quaternary ammonium compound. According to an embodiment, the co-emulsifier may be an alkoxylated quaternary ammonium compound, particularly PEG-n cocomonium chloride with an average molar ratio of ethylene oxide (EO) ranging from 2-15 (n=2-15), and more particularly methanaminium, N-coco-alkyl-N,N-bis(hydropoly(2~4-oxyethyl))chloride (EO average molar ratio 2-4).

Without being particularly limited, the content of the co-emulsifier may range from about 0.01 part by weight to about 1 part by weight, particularly from about 0.01 part by weight to about 0.5 parts by weight, and more particularly from about 0.01 part by weight to about 0.1 part by weight, based on 100 parts by weight of a sum of vinyl acetate and ethylene.

Meanwhile, the aqueous reaction mixture may further include a pH adjuster. A pH of the aqueous reaction mixture is preferably adjusted to be about 3 to about 5 in order to promote the production of radicals which enhance, in turn, the reaction rate. Accordingly, a content of the pH adjuster may be increased or decreased depending on the pH of the aqueous reaction mixture. Any pH adjuster that is typically used in the preparation of VAE emulsions in the art may be available in the art without particular limitations thereto. For example, it may be an organic acid and/or an inorganic acid, such as phosphoric acid, sulfuric acid, hydrochloric acid, succinic acid, tartaric acid, citric acid, etc.

A monocarboxylic acid selected from the group consisting of $C_1$-$C_{14}$ aliphatic monocarboxylic acid and $C_6$-$C_{14}$ aromatic monocarboxylic acid according to the present invention (hereinafter, referred to as "monocarboxylic acid of the present invention"), when used alone or in combination with other organic acids or inorganic acids, can bring about a better improvement in the preservability and storage stability of the final VAE emulsion than when the monocarboxylic acid of the present invention is not used.

Like a conventional pH adjuster, the monocarboxylic acid of the present invention can adjust a pH of the aqueous reaction mixture. In addition, the monocarboxylic acid has a small number of carbon atoms compared to other organic acids and thus can remain in the form of an oligomer in the final VAE emulsion. At a low pH (e.g., a pH of 3-6), the monocarboxylic acid of the present invention makes cell membranes of fungi or bacteria thin to disrupt cells, with the consequent improvement of preservability and storage stability in the final VAE emulsion. By way of example, lactic acid as a pH adjuster may be used, alone or in combination with a different pH adjuster, to adjust a pH of the aqueous reaction mixture. Furthermore, lactic acid remains as an oligomer in the final VAE emulsion and such lactic acid oligomers may bring about the effect of preservability and storage stability in the final VAE emulsion.

Examples of the monocarboxylic acid include, but are not limited to, formic acid, acetic acid, propionic acid, lactic acid, sorbic acid, n-octanoic acid, undec-10-enoic acid, dehydroacetic acid, benzoic acid, salicylic acid, alkyl 4-hydroxybenzoates, naphthenic acid, and n-dodecanoic acid. These compounds may be used alone or in mixture.

Without being particularly limited, the content of the monocarboxylic acid may be on the order of 0.15 to 0.4 parts by weight, based on 100 parts by weight of a sum of vinyl acetate and ethylene.

Optionally, a co-initiator may be added to the aqueous reaction solution according to the present invention. The co-initiator functions to promote radical generation, as exemplified by ferrous ammonium sulfate.

Such a co-initiator may be used as an aqueous solution. For example, a co-initiator-containing aqueous solution may be added the aqueous reaction mixture containing the protective colloid and water and optionally a co-emulsifier and/or a pH adjuster before being fed to a reactor. The aqueous reaction mixture may be mixed with the co-initiator-containing aqueous solution for about 5 min to about 15 min.

The content of the co-initiator is not particularly limited, but may be on the order of about 0.001 part by weight to about 0.01 part by weight, based on 100 parts by weight of a sum of vinyl acetate and ethylene. In the co-initiator-containing aqueous solution, the amount of water is not particularly limited but may be about 10 times to about 20 times as large as that of the co-initiator.

A reactor available in the present invention is a pressurized reactor. Any known pressurized that has an internal pressure of about 0 to about 120 bar may be used in without particular limitations thereto. In this regard, the material of the reactor is required to endure an internal pressure of up to 150 bar.

2) S120 Step

This step is to feed vinyl acetate and ethylene to the reactor of S110 step in a nitrogen atmosphere.

In S120 step, the reactor where the aqueous reaction mixture is prepared in S110 step is purged with nitrogen before feeding vinyl acetate and ethylene. Vinyl acetate and ethylene may be fed sequentially or simultaneously.

Vinyl acetate and ethylene may be used at a weight ratio of 5:95 to 95:5 and preferably at a weight ratio of 10:90 to 60:40.

As for mixing of vinyl acetate and ethylene, its time is not particularly limited, but is preferably on the order of about 10 min to about 30 min and more preferably on the order of about 15 min to about 25 min in terms of improvement in the yield of the polymerization reaction.

Optionally, in addition to vinyl acetate and ethylene, a co-monomer that can be copolymerized with vinyl acetate and ethylene may be fed.

Non-limiting examples of the co-monomer include: vinyl esters of $C_3$-$C_{18}$ carboxylic acid such as vinyl propionate, vinyl butyrate, vinyl 2-ethylhexanoate, vinyl laurate, 1-methyl vinyl acetate, vinyl pivalate and vinyl esters of α-branched monocarboxylic acids having 9 to 11 C atoms, examples being VEOVA9™ or VEOVA10™ esters (available from Momentive Specialty Chemicals); (meth)-acrylic acid ester such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate and norbornyl acrylate; vinyl halides such as vinyl chloride, and vinyl bromide. In addition, (meth) acrylic acid, crotonic acid, maleic acid, itaconic acid, acrylamide, N-methylolacrylamide, N-butoxymethylacrylamide, 2-hydroxyethyl methacrylate, glycidyl methacrylate, allyl sulfonate, vinyl sulfonate, triallyl cyanurate, triallyl isocyanurate, diallyl phthalate, and salts thereof may be used as co-monomers.

The content of such co-monomers is not particularly limited and may range from about 1 part by weight to about 40 part by weight and particularly about 5 part by weight to about 25 parts by weight, based on 100 parts by weight of a sum of vinyl acetate and ethylene.

3) S130 Step

This step is to feed a redox initiator to the reactor of S120 step to initiate the polymerization of vinyl acetate and ethylene.

In S130 step, the internal temperature of the reactor of S120 step is elevated to and stabilized at about 45° C. to about 65° C. before feeding a redox initiator to the reactor to initiate the polymerization between vinyl acetate and ethylene.

The redox initiator comprises an oxidizing agent and a reducing agent.

Here, the reducing agent is a salt of at least one metal selected from the group consisting of silver (Ag), platinum (Pt), copper (Cu), mercury (Hg), zinc (Zn), tin (Sn), lead (Pb), bismuth (Bi), cadmium (Cd), and chromium (Cr). This metal salt undergoes a redox reaction with the oxidizing agent to generate a radical which, in turn, initiates polymerization between vinyl acetate and ethylene to form a vinyl acetate-ethylene copolymer. In this regard, the metal salt is oxidized into a metal oxide. This metal oxide can exert a preservative effect, unlike an alkaline metal oxide resulting from the oxidation of an alkaline metal salt. By way of example, the reducing agent in the redox initiator may be a salt of a metal selected from the group consisting of silver (Ag), copper (Cu), zinc (Zn), and tin (Sn).

The metal salt comprises an anion together with the foregoing metal cation. Examples of the anion include, but are not limited to, carboxylate anion ($COO^-$), sulfoxylate anion ($SO_2^{2-}$), $SO_2^-$—$HCOH$—$(COO)^-$, etc.

This reducing agent may be dissolved in water for use as an aqueous solution. Without being particularly limited, the content of the reducing agent may be on the order of about 0.05 parts by weight to about 0.25 parts by weight, based on 100 parts by weight of a sum of vinyl acetate and ethylene. Less than about 0.05 parts by weight of the reducing agent brings about too low a reaction initiation temperature to run the reaction. When the content of the reducing agent exceeds about 0.25 parts by weight, the reaction is difficult to control due to a rapid increase of reaction temperature. The content of water is not particularly limited and may be, for example, about 10 times to about 30 times as large as that of the reducing agent.

The reducing agent may be fed at a rate of about 200 g/h to about 300 g/h and particularly at a rate of about 220 g/h to about 260 g/h, but without particular limitations thereto. After the reducing agent and the oxidizing agent are fed to the reactor, the reaction is regarded to be initiated when the internal temperature of the reactor increases by about 0.5° C. to about 1.5° C. and preferably about 1° C. From this time, the reducing agent may be fed at a constant rate for about 80 min to about 100 min and particularly for about 85 min to about 95 min.

The weight ratio ($W_2/W_1$) of oxidizing agent content ($W_2$) to reducing agent content ($W_1$) is not particularly limited and may be on the order of 0.9 to 2.5.

So long as it is typically used in preparing a VAE emulsion in the art, any oxidizing agent may be available for the redox initiator in the present invention. Examples include hydrogen peroxide, potassium peroxydisulfate, sodium peroxydisulfate, tert-butyl peroxide, tert-butyl hydroperoxide, potassium peroxodiphosphate, tert-butyl peroxo-pivalate, cumene hydroperoxide, iso-propylbenzene monohydroperoxide, azobisisobutyronitrile, and benzoyl peroxide, but without limitations thereto. These compounds may be used singly or in mixture.

The oxidizing agent may be dissolved in water for use as a solution. In this regard, the content of the oxidizing agent is determined according to kinds thereof and may range from about 0.05 parts by weight to about 0.25 parts by weight, based on 100 parts by weight of a sum of vinyl acetate and ethylene. The content of water is not particularly limited and may be about 10 times to about 30 times as large as that of the oxidizing agent.

The feeding rate of the oxidizing agent is determined in consideration of that of the reducing agent. For example, the feeding rate of the oxidizing agent may be about ⅖ times to about ⅗ times and particularly about ½ times as large as that of the reducing agent. By way of example, the oxidizing agent may be fed at a rate of about 88 g/h to about 156 g/h and particularly at a rate of about 100 g/h to about 130 g/h. Also, the oxidizing agent may be fed at a constant rate for about 80 min to about 100 min and particularly for about 85 min to about 95 min as described in the reducing agent when the polymerization starts after the oxidizing agent is fed at the rate.

4) S140 Step

This step is to feed vinyl acetate to the reactor of S130 step after initiation of the polymerization reaction.

In S140 step, vinyl acetate is further added to the reactor where a vinyl acetate-ethylene copolymer is being polymerized after the polymerization reaction starts, thereby improving the reaction yield.

About 1 min to about 5 min, particularly about 2 min to about 4 min after start of the polymerization reaction, vinyl acetate is fed to the reactor for about 80 min to about 100 min. In this regard, vinyl acetate may be fed at a rate of about 5 g/min to about 7 g/min.

(2) Step of Removing Residual Monomer after Completion of Polymerization Reaction After completion of the polymerization reaction in S100 step, a $2^{nd}$ redox initiator identical to or different from the redox initiator may be added as needed to the emulsion containing the vinyl acetate-ethylene copolymer formed in the polymerization reaction (hereinafter referred to as "S200 step").

S200 step is to remove the residual monomer vinyl acetate from an emulsion containing the vinyl acetate-ethylene copolymer.

To this end, in S200 step, the $2^{nd}$ redox initiator is added to the emulsion containing the vinyl acetate-ethylene copolymer obtained in S100 step. The $2^{nd}$ redox initiator comprises a $2^{nd}$ oxidizing agent and a $2^{nd}$ reducing agent and these agents may be dissolved in water for use as solutions. That is, a solution of the $2^{nd}$ oxidizing agent and a solution of the $2^{nd}$ reducing agent may be simultaneously added to the emulsion for the same time.

The $2^{nd}$ redox initiator in S200 step may be identical to or different from the redox initiator in S100 step (hereinafter referred to as "$1^{st}$ redox initiator"). That is, the $2^{nd}$ oxidizing agent may be identical to or different from the oxidizing agent in the $1^{st}$ redox initiator (hereinafter referred to as "$1^{st}$ oxidizing agent") and the $2^{nd}$ reducing agent may be identical to or different from the reducing agent (hereinafter referred to as "$1^{st}$ reducing agent").

Examples of the $2^{nd}$ oxidizing agent are as described for the $1^{st}$ oxidizing agent. For example, the $2^{nd}$ oxidizing agent may be tert-butyl hydroperoxide.

Without particular limitations thereto, the content of the $2^{nd}$ oxidizing agent may be on the order of 0.01 to 0.2 parts by weight, based on 100 parts by weight of residual monomers.

Examples of the $2^{nd}$ reducing agent include alkaline metal salts, particularly, sulphites of alkaline metals (e.g., sulphite of alkaline metal and ammonium), bisulphites of alkaline metals (e.g., bisulphite of alkaline metal and ammonium), sulfoxylates of alkaline metals (e.g., alkaline metal formaldehyde-sulfoxylate), and more particularly sodium sulphite, and sodium formaldehyde-sulfoxylate (Bruggolite® FF6) in addition to the metal salts enumerated for the $1^{st}$ reducing agent, but are not limited thereto. For instance, the $2^{nd}$ reducing agent may be sodium formaldehyde-sulfoxylate (Bruggolite® FF6). Meanwhile, when the $2^{nd}$ reducing agent is a salt of at least one metal selected from the group consisting of silver (Ag), platinum (Pt), copper (Cu), mercury (Hg), zinc (Zn), tin (Sn), lead (Pb), bismuth (Bi), cadmium (Cd), and chromium (Cr), like the $1^{st}$ reducing agent, the metal oxide formed by the oxidation of the metal salt has a preservative effect, thus further improving the preservability and storage stability of the vinyl acetate-ethylene copolymer emulsion.

Without particular limitations thereto, the content of the $2^{nd}$ reducing agent may be on the order of 0.01 to 0.15 parts by weight, based on 100 parts by weight of the residual monomers. Further, the weight ratio ($W_4/W_3$) of $2^{nd}$ oxidizing agent content ($W_4$) to $2^{nd}$ reducing agent content ($W_3$) is not particularly limited and may be about 1 to about 1.5.

As described above, the $2^{nd}$ oxidizing agent and the $2^{nd}$ reducing agent in S200 step may be separately dissolved in water for use as solutions. The water contents in the solutions are adjusted depending on kinds and contents of the $2^{nd}$ oxidizing agent and the $2^{nd}$ reducing agent. For example, the contents of water in the solutions may be about 1 to about 10 times as large as those of the $2^{nd}$ oxidizing agent and the $2^{nd}$ reducing agent, respectively.

(3) Step of Adding Additive

An additive may be added as needed to the vinyl acetate-ethylene copolymer emulsion after S100 step or S200 step. Available is an additive that can be added to an aqueous emulsion. An antifoaming agent, a dispersant, etc. may be used, singly or in mixture, as an additive.

So long as it is known in the art, any antifoaming agent may be used with particular limitations thereto. For example, silicon-, alcohol-, polyether-, mineral oil-, modified silicon-, and emulsion-based antifoaming agents may be used.

Non-limiting examples of the dispersant include polycarbonic acid-based compounds, polyester-based compounds, polycarbonic acid ester-based compounds, unsaturated polyamide-based compounds, polyalkyl carbonate compounds, polyacryl-based compounds, polyethylenimine-based compounds, and polyurethane-based compounds, which may be used singly or in mixture.

The content of the additive is not particularly limited and may be appropriately controlled depending on kinds thereof. For example, it may be on the order of about 0.01% by weight to about 10% by weight, particularly about 0.01% by weight to about 5% by weight and more particularly about 0.01% by weight to about 2% by weight, based on the total weight of the vinyl acetate-ethylene copolymer emulsion.

The present invention provides the vinyl acetate-ethylene copolymer emulsion (hereinafter referred to as "VAE emulsion") prepared by the method described above and particularly prepared by using the redox initiator described above.

In one embodiment, the vinyl acetate-ethylene copolymer emulsion comprises (a) vinyl acetate-ethylene copolymer; (b) water; and (c) an oxide of at least one metal selected from silver (Ag), platinum (Pt), copper (Cu), mercury (Hg), zinc (Zn), tin (Sn), lead (Pb), bismuth (Bi), cadmium (Cd), and chromium (Cr).

In another embodiment, the vinyl acetate-ethylene copolymer emulsion comprises (a) vinyl acetate-ethylene copolymer; (b) water; (c) an oxide of at least one metal selected from silver (Ag), platinum (Pt), copper (Cu), mercury (Hg), zinc (Zn), tin (Sn), lead (Pb), bismuth (Bi), cadmium (Cd), and chromium (Cr); and (d) an oligomer of the monocarboxylic acid selected from the group consisting of $C_1$-$C_{14}$ aliphatic monocarboxylic acid and $C_6$-$C_{14}$ aromatic monocarboxylic acid.

The metal oxide results from the oxidation of the metal salt during polymerization of the vinyl acetate-ethylene copolymer and the metal of the metal oxide is the same as that of the metal salt in the redox initiator used to prepare the VAE emulsion. This metal oxide exhibits a preservative effect. Here, typical metal oxides commercially available in the art can exhibit a preservative effect, like the metal oxide of the present invention. However, the commercially available metal oxides cannot be directly used in the VAE emulsion due to their poor solubility in water and require a pretreatment with an alkyl-based compound such as triethanolamine for increasing the solubility. In addition, in spite of the pretreatment, commercially available metal oxides tend to undergo gelation and coagulation in a VAE emulsion and thus are difficult to be used in a VAE emulsion, as shown in FIG. 7b. By contrast, the metal oxide of the present invention is formed during the VAE emulsion preparation and thus does not require a pretreatment for enhancing the solubility. Further, the metal oxide of the present invention does not undergo gelation, but is uniformly dispersed in the VAE emulsion, unlike commercially available metal oxides. Hence, the present invention can simplify the preparation process and reduce the production cost, compared to the addition of a separate metal oxide to a VAE emulsion.

The content of the metal oxide varies depending on that of the reducing agent in the redox initiator used for the preparation of VAE emulsion and may be, for example, on the order of about 50 ppm to about 300 ppm, based on the total weight of the corresponding VAE emulsion.

Without being particularly limited, the content of the vinyl acetate-ethylene copolymer may range from about 40% by weight to about 70% by weight, based on the total weight of the VAE emulsion.

The content of water is not particularly limited and may be, for example, the balance to form 100% by weight of the corresponding VAE emulsion.

The VAE emulsion may further comprise a monocarboxylic acid oligomer. The monocarboxylic acid oligomer comprises repeating units derived from monocarboxylic acid. Here, the monocarboxylic acid is selected from the group consisting of $C_1$-$C_{14}$ aliphatic monocarboxylic acid and $C_6$-$C_{14}$ aromatic monocarboxylic acid. A description about concrete examples thereof is omitted because they are the same as described in the preparation method for the VAE emulsion. According to an embodiment, the VAE emulsion may comprise the lactic acid oligomer represented by the following Chemical Formula a:

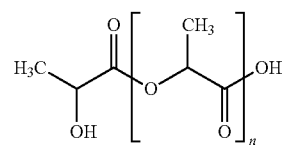

[Chemical Formula a]

(wherein n is a positive number of 1 or higher, particularly an integer of 1 to 100, more particularly 1 to 50, far more particularly 1 to 25).

The content of the monocarboxylic acid oligomer varies depending on that of the monocarboxylic acid used for VAE emulsion preparation and may range, for example, from about 0.01% by weight to about 10% by weight and particularly from about 0.1% by weight to about 5% by weight, based on the total weight of the corresponding VAE emulsion.

In addition, the VAE emulsion may contain a protective colloid, a residual initiator, an unreacted monomer, a co-emulsifier, and a pH adjuster.

The VAE emulsion may further comprise an additive such as an antifoaming agent, and a dispersant, as needed. Their contents are as described in the addition step of additives above.

In contrast to conventional VAE emulsions, the VAE emulsion of the present invention has excellent preservability and storage stability thanks to the preservative effect of the metal oxide formed during the preparation thereof without adding a separate preservative to the emulsion after polymerization. That is, the VAE emulsion does not substantially contain a separate preservative such as 5-chloro-2-methyl-4-isothiazolin-3-one (CMIT), 2-methyl-4-isothiazolin-3-one (MIT), 1,2-benzisothiazolin-3-one (BIT), dodecylguanidine hydrochloride (DGH). Here, the expression "does not substantially contain" is intended to mean that a separate preservative is not contained at all or if contained, is present in such a very small amount as not to exhibit a preservative effect. According to an embodiment, the VAE emulsion may comprise a separate preservative (additional preservative) in an amount of about 200 ppm or less and particularly about 50 ppm.

Hereinafter, the present invention will be described in detail with reference to examples. These examples are only for illustrating the present invention more specifically, and it will be apparent to those skilled in the art that the scope of the present invention is not limited by these examples.

COMPARATIVE EXAMPLE 1: PREPARATION OF VINYL ACETATE-ETHYLENE COPOLYMER EMULSION

To a $1^{st}$ vessel was fed 5520 g of process water, followed by 178 g of PVOH (25/88, degree of polymerization/degree of saponification) and 81 g of PVOH (05/88). Stirring the reactants for 20 min afforded a $1^{st}$ aqueous reaction solution (pH 4). In a $2^{nd}$ vessel, 0.21 g of ferrous ammonium sulfate and 0.21 g of citric acid were added to 3.42 g of process water and completely dissolved to obtain a $2^{nd}$ aqueous reaction solution. Then, the $2^{nd}$ aqueous reaction solution was added to the $1^{st}$ aqueous reaction solution and stirred for 10 min. The resulting aqueous reaction solution was fed to a pressurized reactor (maximum internal pressure: 80 bar).

Subsequently, the inside of the pressurized reactor was sufficiently purged with nitrogen and 3021 g of vinyl acetate was fed into the pressurized reactor, followed by 882 g of ethylene gas. The reactants were stirred for about 20 min.

Then, the temperature of the pressurized reactor was elevated to and stabilized at about 55° C. before feeding a redox initiator to the pressurized reactor. In this regard, an oxidizing agent-containing solution and a reducing agent-containing solution were fed at rates of about 120 g/hour and about 240 g/hour, respectively. The feeding of the oxidizing agent-containing solution and the reducing agent-containing solution was continued for 90 min from the time point when the internal temperature of the reactor increased by about 1° C., which was regarded as the initiation of the polymerization reaction. Here, the oxidizing agent-containing solution and the reducing agent-containing solution in the redox initiator were a solution of 8.16 g of tert-butyl hydroperoxide in 211.32 g of process water and a solution of 8.06 g of sodium formaldehyde sulfoxylate (Bruggolite© FF6, Brueggemann Chemical US) in 100.3 g of process water, respectively.

From 3 min. after initiation of the polymerization reaction, vinyl acetate was additionally fed at a rate of about 6.2 g/min for about 90 min.

After completion of the polymerization reaction, a $2^{nd}$ redox initiator was fed for 15 min to the pressurized reactor to remove (reduce) residual vinyl acetate monomers, thus obtaining a $1^{st}$ emulsion containing a vinyl acetate-ethylene copolymer. Here, the $2^{nd}$ redox initiator included a $2^{nd}$ oxidizing agent-containing solution obtained by dissolving 2.47 g of tert-butyl hydroperoxide in 17.95 g of process water and a $2^{nd}$ reducing agent-containing solution obtained by dissolving 1.13 g of FF6 in 17.5 g of process water.

One hour later, 50 ppm of potassium iodate ($KIO_3$) was to the $1^{st}$ emulsion to obtain a $2^{nd}$ emulsion to which 4.8 ppm of 2-methyl-4-isothiazolin-3-one (MIT), 10 ppm of 5-chloro-2-methyl-4-isothiazolin-3-one (CMIT), 100 ppm of 1,2-benzisothiazolin-3-one (BIT), and 100 ppm of dodecylguanidine hydrochloride (DGH) were then added to afford a $3^{rd}$ emulsion containing a vinyl acetate-ethylene copolymer.

COMPARATIVE EXAMPLE 2

A vinyl acetate-ethylene copolymer-containing emulsion was prepared in the same manner as in Comparative Example 1, with the exception that 50 ppm of $KIO_3$, 4.8 ppm of MIT, 10 ppm of CMIT, 100 ppm of BIT, and 100 ppm of DGH were not added.

COMPARATIVE EXAMPLE 3

A vinyl acetate-ethylene copolymer-containing emulsion was prepared in the same manner as in Comparative Example 1, with the exception that 260 ppm of ZnO was added, instead of 50 ppm of $KIO_3$, 4.8 ppm of MIT, 10 ppm of CMIT, 100 ppm of BIT, and 100 ppm of DGH. The ZnO used was pretreated with tri-ethanol amine.

However, the vinyl acetate-ethylene copolymer-containing emulsion prepared could not be used as an emulsion because ZnO particles were gelled and coagulated as shown in FIG. 7b.

EXAMPLE 1

A vinyl acetate-ethylene copolymer-containing emulsion was prepared in the same manner as in Comparative Example 1, with the exception that 35.05 g of a zinc salt was used instead of 8.06 g of Bruggolite® FF6 serving as a reducing agent in the redox initiator and that none of 50 ppm of $KIO_3$, 4.8 ppm of MIT, 10 ppm of CMIT, 100 ppm of BIT, and 100 ppm of DGH were used. The zinc salt used has a structure represented by the following Chemical Formula 1:

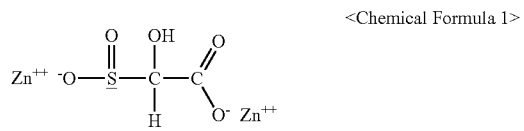

<Chemical Formula 1>

FIG. 7a is a photographic image illustrating the vinyl acetate-ethylene copolymer-containing emulsion prepared in Example 1. In contrast to the VAE emulsion of Comparative Example 3, as shown in FIG. 7a, the VAE emulsion of Example 1 was found to have gelled or coagulated particles.

EXAMPLE 2

A vinyl acetate-ethylene copolymer emulsion was prepared in the same manner as in Example 1, with the exception that 15 g of lactic acid and 3.67 g of the co-emulsifier coconut alkyl bis(2-hydroxyethyl)methyl quaternary ammonium chloride were added, together with PVOH, for preparing the $1^{st}$ solution. None of 50 ppm of $KIO_3$, 4.8 ppm of MIT, 10 ppm of CMIT, 100 ppm of BIT, and 100 ppm of DGH were added to the $2^{nd}$ emulsion.

EXPERIMENTAL EXAMPLE 1: ASSAY 1 FOR ANTI-FUNGAL RESISTANCE OF VAE EMULSION

The vinyl acetate-ethylene copolymer emulsion prepared in Example 1 and Comparative Examples 1 and 2 were assayed preservability (anti-fungal activity) as follows.

A fungus strain (*Aspergillus brasiliensis* ATCC 16404) was inoculated to each of the final vinyl acetate-ethylene copolymer emulsions prepared in Example 1 and Comparative Examples 1 and 2 and cultured at 25° C. for 72 hours. Thereafter, observation was made to see whether or not the emulsions were putrefied by the fungus, and the results are depicted in FIG. 1.

As can be seen in FIG. 1, the vinyl acetate-ethylene copolymer emulsion of Example 1 exhibited an effect of significantly preventing fungal infiltration, compared to the emulsion of Comparative Example 2 containing no preservatives, although if in not reached the anti-fungal effect of the emulsion of Comparative Example 1, which contained a preservative.

The vinyl acetate-ethylene copolymer emulsion according to Example 1 was found to exhibit a preservative and anti-fungal effect even without treatment with a preservative such as isothiazolinone-based preservatives (e.g., MIT, CMIT, BIT, etc.) or DGH.

EXPERIMENTAL EXAMPLE 2: ASSAY 2 FOR ANTI-FUNGAL RESISTANCE OF VAE EMULSION

In order to examine whether the use of lactic acid in the preparation of a vinyl acetate-ethylene copolymer emulsion in Examples 1 and 2 have a preservative (anti-fungal) effect on the vinyl acetate-ethylene copolymer emulsion, an assay was conducted as follows.

A fungus strain (*Aspergillus brasiliensis* ATCC 16404) was inoculated to each of the final vinyl acetate-ethylene copolymer emulsions prepared in Examples 1 and 2 and cultured at 25° C. for 72 hours. Subsequently, a degree of contamination by fungus was investigated and the results are given in FIG. 2 and Table 1. The degrees of contamination was evaluated as follows:
* Degree of Contamination
0: None
1: Very low (less than 10%)
2: Low (from 10% to less than 30%)
3: Moderate (from 30% to less than 60%)
4: High (60% or more)

TABLE 1

|  | Sample | |
| --- | --- | --- |
|  | Example 1 | Example 2 |
| Inoculum | *Aspergillus brasiliensis* ATCC 16404 | |
| Culture Temperature | 25° C. | |
| Degree of Contamination | 3 | 1 |

As is understood from data of Table 1 and FIG. 2, both the vinyl acetate-ethylene copolymer emulsions of Examples 1 and 2 exhibited the effect of preventing fungal infiltration thereto despite of free of a preservative. Particularly, the emulsion of Example 2 using lactic acid in preparation thereof was found to have a higher preservative and antifungal effect, compared to that of Example 1, which did not employ lactic acid in the preparation thereof.

When prepared by using a monocarboxylic acid, such as lactic acid, in the polymerization thereof, the vinyl acetate-ethylene copolymer emulsion according to Examples was observed to be further improved in preservability and antifungal resistance.

EXPERIMENTAL EXAMPLE 3: PRESERVABILITY OF VAE EMULSION

In order to examine the preservability of the VAE emulsion prepared in Example 2, an assay was conducted as follows, and the result is depicted in FIG. 3.

The vinyl acetate-ethylene copolymer emulsion prepared in Example 2 was spread on a PDA (potato dextrin agar) plate and a TSA (tryptone soya agar) plate and monitored with the naked eye for putrefaction at 25° C. for 4 days.

As shown in FIG. 3, the VAE emulsion of Example 2 was putrefied on neither of PDA nor TSA for 4 days.

As such, the VAE emulsion prepared according to the Example was found to have excellent preservability.

EXPERIMENTAL EXAMPLE 4: PARTICLE SIZE DISTRIBUTION IN VAE EMULSION

Size distributions of vinyl acetate-ethylene copolymer particles in the final VAE emulsions prepared in Example 2 and Comparative Example 1 were measured and the results are depicted in FIG. 4.

As is understood from the data of FIG. 4, VAE particles had an average particle size of about 1 μm in the VAE emulsion of Example 2 and about 1.2 μm in the VAE emulsion of Comparative Example 1.

It was found that the use of a co-emulsifier in the polymerization to prepare the vinyl acetate-ethylene copolymer emulsion can make VAE particle sizes smaller in the final emulsion in a controllable manner.

EXPERIMENTAL EXAMPLE 5: TEST FOR WATER-WHITENING EFFECT OF VAE EMULSION

The final VAE emulsions prepared in Example 2 and Comparative Example 1 were tested for water resistance as follows and the results are depicted in FIG. 5.

The VAE emulsions prepared in Example 2 and Comparative Example 1 were dried to make transparent films. Then, water drops were loaded onto each transparent film. The time points at which the water drop-loaded sites of the transparent films turned white were monitored with the naked eye.

As a result of the observation, the transparent film of Comparative Example 1 became opaque (white) at 3 min. 2 sec. after a water drop was loaded thereon so that the letters under the film were not read in the site of the water drop. By contrast, the letters under the transparent film of Example 1 could be barely discerned through the site of the water drop 3 min. 2 sec. after the water drop was loaded, but could not be read at all 9 min. 46 sec after the loading (see FIG. 5b).

It was thus found that a transparent film having excellent water resistance could be made of the vinyl acetate-ethylene copolymer emulsion prepared using a co-emulsifier according to the Example.

EXPERIMENTAL EXAMPLE 6: ADHESION AND COHESION OF VAE EMULSION

The final VAE emulsions prepared in Example 2 and Comparative Example 1 were measured for adhesion and cohesion as follows and the results are given in Table 2 and FIG. 6.

1) Wet Peel (Cloth/Cloth)

A suitable amount of the VAE emulsion of Example 2 was loaded on a cloth and primarily applied using #10 rod in the top-to-bottom direction. After 60 sec., a suitable amount of the VAE emulsion of Example 2 was loaded again and secondarily applied using #40 rod in the top-to-bottom direction. After 60 sec., the lower end and the upper end of the cloth were engaged with each other and compressed using a 7lb roller in the top-to-bottom direction. Thereafter, the cloth was dried in an incubator (25° C., 60%) for 24 hours. Then, the cloth coated with the VAE emulsion was cut to make samples having a width of 1 inch. The samples were immersed in water for 1 hour and measured for 180° peel strength, using Instron. A control sample was prepared in the same manner as is described above, with the exception of applying the VAE emulsion of Comparative Example 1 to a cloth.

2) Peel (PVC/Cloth)

A PVC film was surface treated with methanol and cut (size: 1 inch×5 inch). Thereafter, a suitable amount of the VAE emulsion of Example 2 was loaded on the surface-treated PVC film and primarily applied using #40 rod in the top-to-bottom direction. Immediately after completion of the application, a cloth was placed on the VAE emulsion of Example 2 and compressed once using a 7lb roller, followed by drying in an incubator (25° C., 60%) for 24 hours. Then, 180° peel strength between the PVC and the cloth was measure using Instron. A control sample was prepared in the same manner as is described above, with the exception of applying the VAE emulsion of Comparison Example 1 to a cloth.

3) Creep Rate (Cloth/Cloth, @77° C.)

A suitable amount of the VAE emulsion of Example 2 was loaded on a cloth and primarily applied using #10 rod in the top-to-bottom direction. After 60 sec., a suitable amount of the VAE emulsion of Example 2 was loaded again and secondarily applied using #40 rod in the top-to-bottom direction. After 60 sec., the lower end and the upper end of the cloth were engaged with each other and compressed using a 7Ib roller in the top-to-bottom direction. Thereafter, the cloth was dried in an incubator (25° C., 60%) for 24 hours. Then, the cloth coated with the VAE emulsion was cut to make samples having a width of 1 inch. The sample was left at 77° C. for 15 min in an oven, with the one side thereof fixed to the oven by using a clamp. Another side of the sample was suspended by a weight of 500 g by a clamp. A distance to which the cloth had been stretched per hour was measured. A control sample was prepared in the same manner as is described above, with the exception of using applying the VAE emulsion of Comparative Example 1 to a cloth.

TABLE 2

|  | Control Sample (Comparative Example 1) | Sample (Example 2) |
|---|---|---|
| Wet peel (cloth/cloth) (lb/in) | 0.071 | 0.123 |
| Peel (PVC/cloth) (lb/in) | 1.012 | 1.151 |
| Creep Rate (cloth/cloth @77° C.) (mm/min) | 0.75 | 0.56 |

As can be seen in Table 2, the VAE emulsion of Example 2 was about 173% higher in wet peel and about 114% higher in peel against PVC than that of Comparative Example 1. In addition, the VAE emulsion of Example 2 was lower in creep rate than that of Comparative Example 1.

Consequently, the VAE emulsion prepared according to the present invention is superior in terms of adhesion and cohesion to conventional VAE emulsions.

Figure 1:
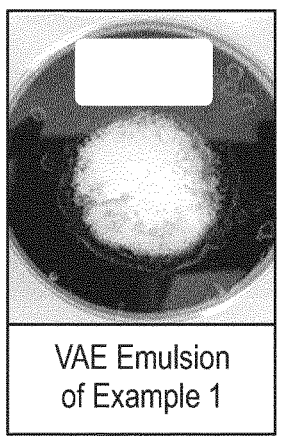
FIG. 1 is a photographic image accounting for results of an assay for anti-fungal resistance of vinyl acetate-ethylene copolymer emulsions prepared in Example 1 and Comparative Examples 1 and 2.
Figure 1:
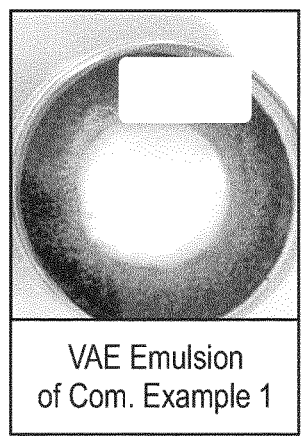
Figure 1:
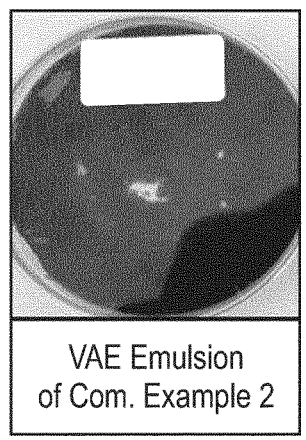
Figure 2:
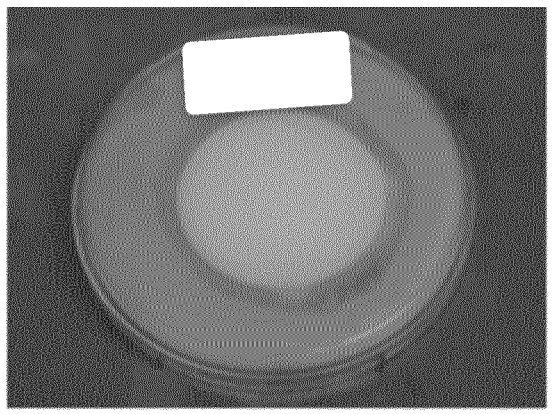
FIG. 2 shows photographic images accounting for results of an assay for anti-fungal resistance of vinyl acetate-ethylene copolymer emulsions prepared in Examples 1 and 2.
Figure 2:
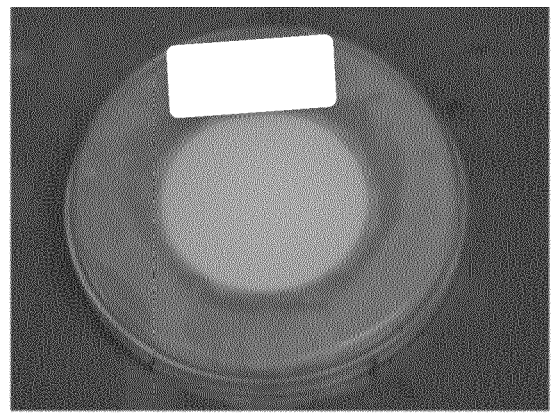
Figure 2:
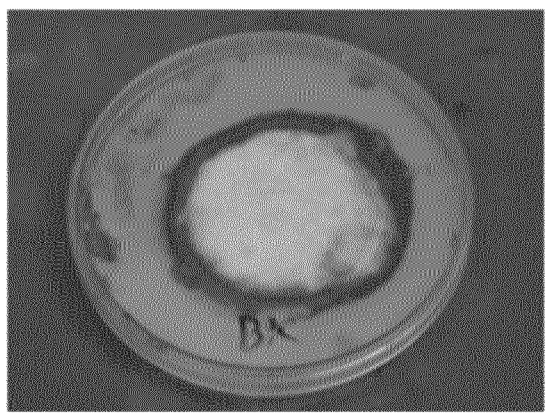
Figure 2:
Figure 3:
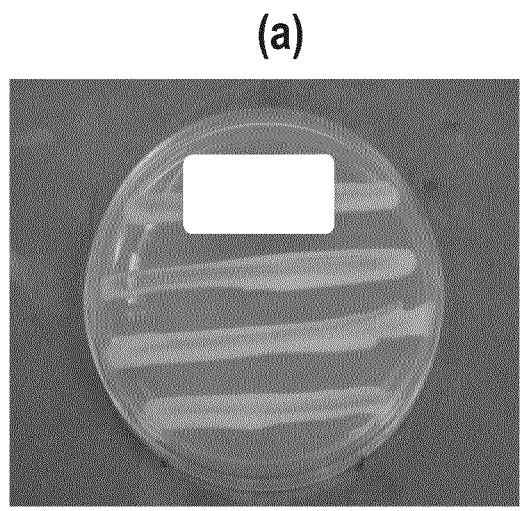
FIG. 3 shows photographic images accounting for the preservability of the vinyl acetate-ethylene copolymer emulsion prepared in Example 2 as measured on a TSA (tryptone soya agar) plate (a) and on a PDA (potato dextrin agar) plate (b).
Figure 3:
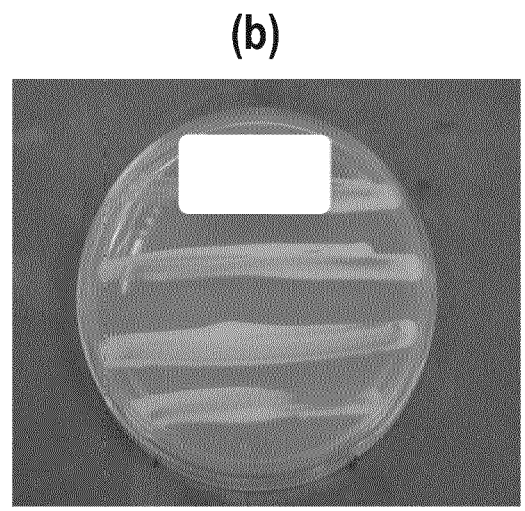
Figure 4:
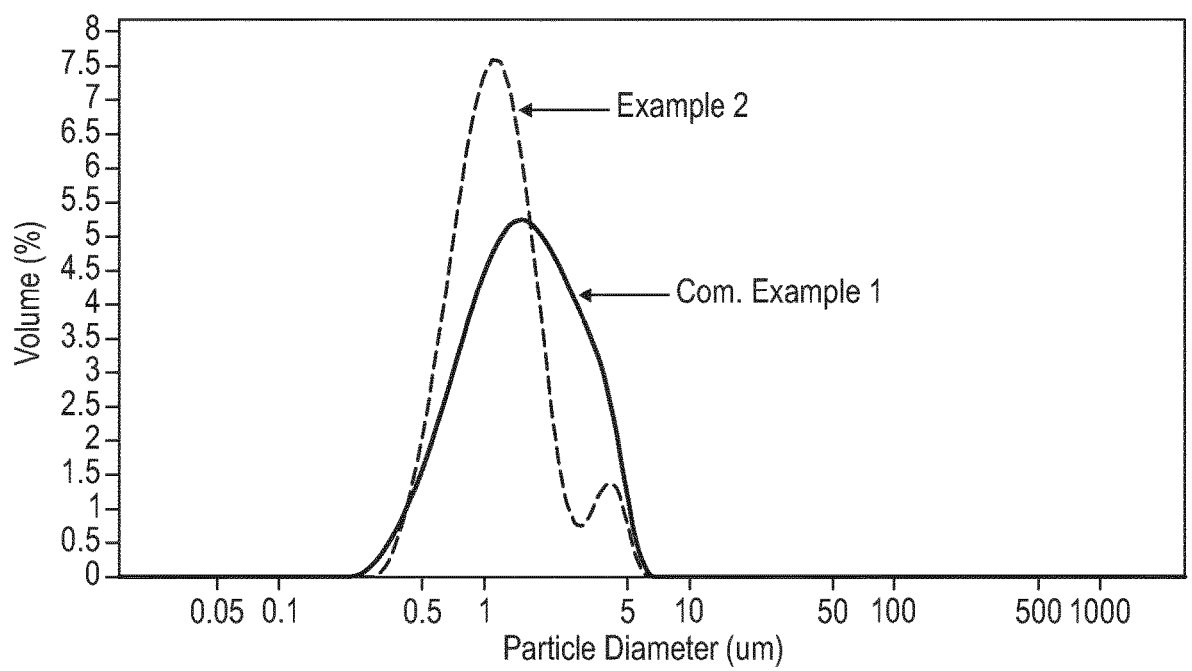
FIG. 4 is a graph accounting for particle size distributions in vinyl acetate-ethylene copolymer emulsions prepared in Example 2 and Comparative Example 1.
Figure 5:
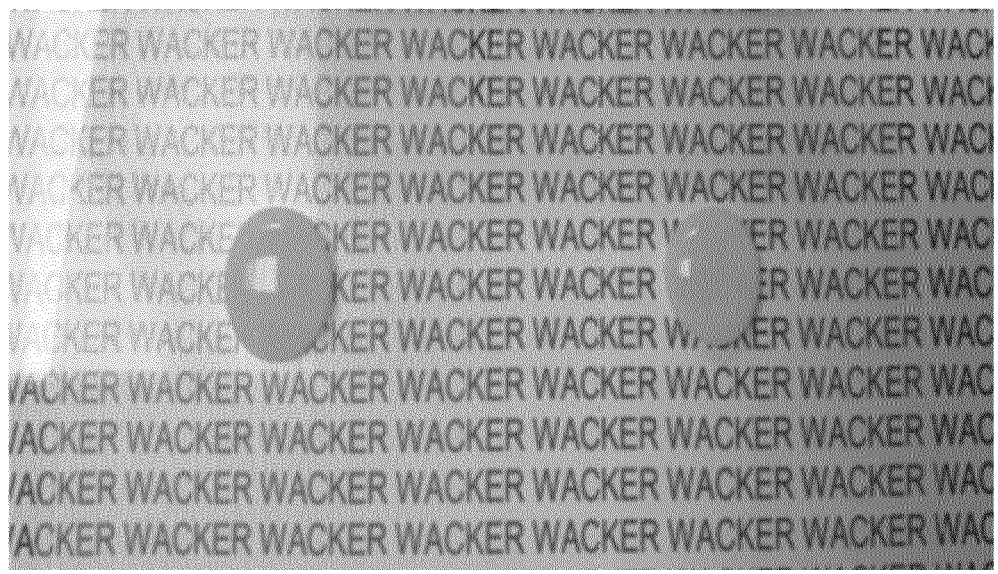
FIG. 5 shows photographic images accounting for water resistance of the vinyl acetate-ethylene copolymer emulsions prepared in Example 1 and Comparative Example 1, taken at 3 min. 2 sec. (a) and 9 min. 46 sec. (b) after water drops were loaded on the films.
Figure 5:
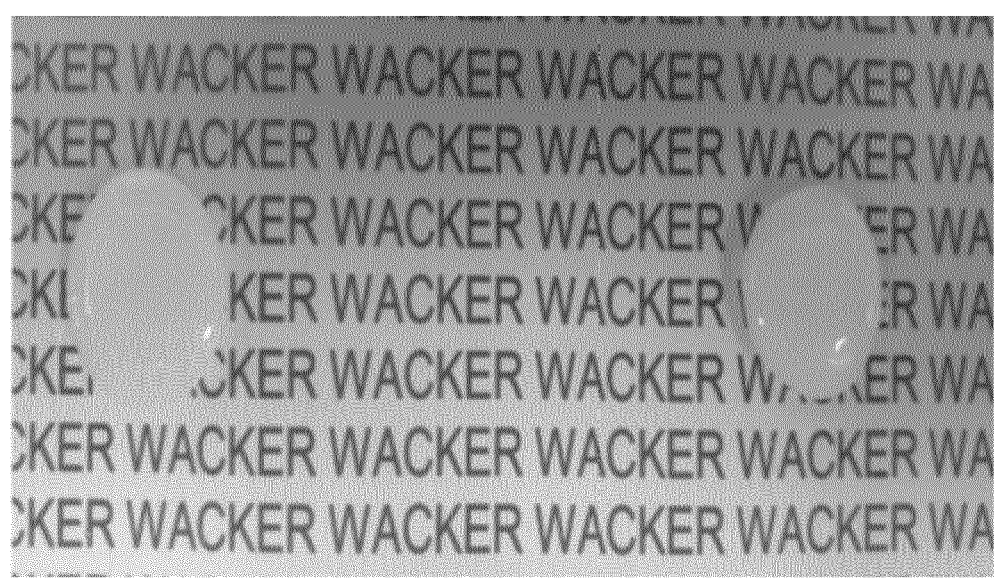
Figure 6:
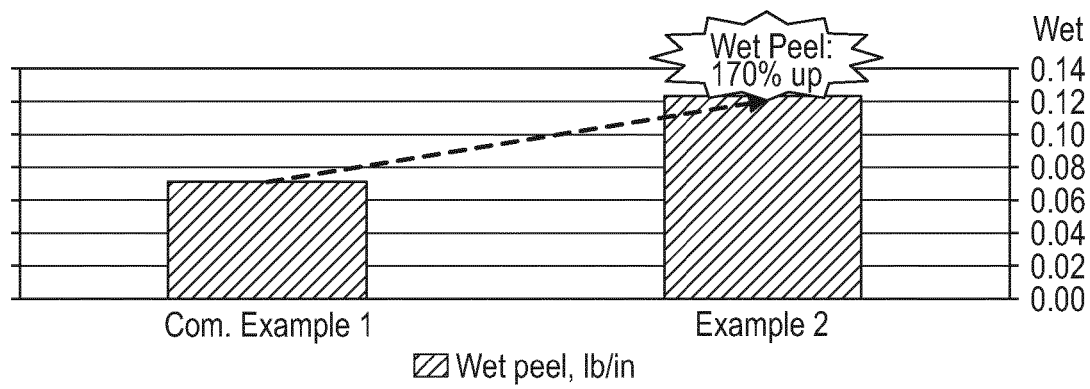
FIG. 6 is a graph accounting for wet peel of the vinyl acetate-ethylene copolymer emulsions prepared in Comparative Example 1 and Example 2.
Figure 7:
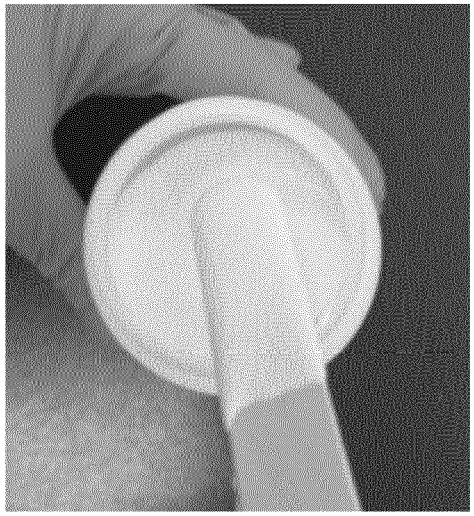
FIG. 7 shows photographic images accounting for whether the vinyl acetate-ethylene copolymer emulsions of Example 1 (a) and Comparative Example 3 (b) have undergone gelation or not.
Figure 7:

The invention claimed is:

1. A copolymer emulsion, comprising:
a vinyl acetate-ethylene copolymer emulsion prepared by using a redox initiator;
wherein the redox initiator comprises a salt of at least one metal selected from the group consisting of silver (Ag), platinum (Pt), copper (Cu), mercury (Hg), zinc (Zn), tin (Sn), lead (Pb), bismuth (Bi), cadmium (Cd), and chromium (Cr);
wherein the vinyl acetate-ethylene copolymer emulsion further comprises an oligomer of a monocarboxylic acid selected from the group consisting of $C_1$-$C_{14}$ aliphatic monocarboxylic acid and $C_6$-$C_{14}$ aromatic monocarboxylic acid; and
wherein the oligomer of the monocarboxylic acid is present in an amount of 0.15 to 0.4 parts by weight based on 100 parts by weight of the vinyl acetate-ethylene copolymers.

2. The copolymer emulsion of claim 1, wherein the metal salt is oxidized to form a metal oxide during the polymerization of the vinyl acetate-ethylene copolymer.

3. The copolymer emulsion of claim 1, wherein the redox initiator comprises a salt of at least one metal selected from the group consisting of silver (Ag), copper (Cu), zinc (Zn), and tin (Sn).

4. The copolymer emulsion of claim 1, wherein the metal salt includes an anion selected from the group consisting of a carboxylate anion ($COO^-$), a sulfoxylate anion ($SO_2^{2-}$), and $SO_2^-$—HCOH—(COO).

5. The copolymer emulsion of claim 1, wherein said copolymer further comprises:
(a) vinyl acetate-ethylene copolymer;
(b) water; and
(c) a metal oxide, which is formed by oxidization of the metal salt during the polymerization of the vinyl acetate-ethylene copolymer.

6. The copolymer emulsion of claim 1, further comprising a metal oxide, wherein the metal oxide is present at a content of 100 to 300 ppm, based on the total weight of the corresponding vinyl acetate-ethylene copolymer emulsion.

7. The copolymer emulsion of claim 6, wherein the monocarboxylic acid is selected from the group consisting of formic acid, acetic acid, propionic acid, lactic acid, sorbic acid, n-octanoic acid, undec-10-enoic acid, dehydroacetic acid, benzoic acid, salicylic acid, alkyl 4-hydroxybenzoates, naphthenic acid, and n-dodecanoic acid.

8. A method for preparing a vinyl acetate-ethylene copolymer emulsion, the method comprising:
polymerizing vinyl acetate and ethylene in presence of a redox initiator in a protective colloid-containing aqueous reaction solution, wherein the redox initiator comprises a salt of at least one metal selected from the group consisting of silver (Ag), platinum (Pt), copper (Cu), mercury (Hg), zinc (Zn), tin (Sn), lead (Pb), bismuth (Bi), cadmium (Cd), and chromium (Cr), wherein the aqueous reaction solution further includes a monocarboxylic acid selected from the group consisting of $C_1$-$C_{14}$ aliphatic monocarboxylic acid and $C_6$-$C_{14}$ aromatic monocarboxylic acid, and wherein the monocarboxylic acid is present in an amount of 0.15 to 0.4 parts by weight based on 100 parts by weight of a sum of vinyl acetate and ethylene.

9. The method of claim 8, wherein the metal salt in oxidized to form a metal oxide during the formation of the vinyl acetate-ethylene copolymer in the polymerization.

10. The method of claim 8, wherein a content of the metal salt ranges from 0.05 to 0.02 parts by weight, based on 100 parts by weight of a sum of vinyl acetate and ethylene.

11. The method of claim 8, wherein the aqueous reaction solution further comprises a co-emulsifier.

12. The method of claim 11, wherein the co-emulsifier comprises PEG-n cocomonium chloride (n=2~15).

13. The method of claim 11, wherein the co-emulsifier is contained in an amount of 0.01 to 0.1 parts by weight, based on 100 parts by weight of a sum of vinyl acetate and ethylene.

14. The method of claim 13, wherein the monocarboxylic acid is contained in an amount of 0.15 to 0.4 parts by weight, based on 100 parts by weight of a sum of vinyl acetate and ethylene.

15. The method of claim 8, further comprising a step of adding a second redox initiator identical to or different from the redox initiator to the vinyl acetate-ethylene copolymer-containing emulsion formed in the polymerization step, after completion of the polymerization.

16. The method of claim 15, wherein the second redox initiator comprises a salt of at least one metal selected from the group consisting of silver (Ag), platinum (Pt), copper (Cu), mercury (Hg), zinc (Zn), tin (Sn), lead (Pb), bismuth (Bi), cadmium (Cd), and chromium (Cr).

17. The method of claim 8, wherein the redox initiator comprises one or more oxidizing agents, and wherein the one or more oxidizing agents are selected from the group consisting of hydrogen peroxide, potassium peroxydisulfate, sodium peroxydisulfate, tert-butyl peroxide, tert-butyl hydroperoxide, potassium peroxodiphosphate, tert-butyl peroxo-pivalate, cumene hydroperoxide, isopropylbenzene monohydroperoxide, azobisisobutyronitrile and benzoyl peroxide ($C_{14}H_{10}O_4$).

18. The copolymer emulsion of claim 1, wherein the redox initiator comprises one or more oxidizing agents, and wherein the one or more oxidizing agents are selected from the group consisting of hydrogen peroxide, potassium peroxydisulfate, sodium peroxydisulfate, tert-butyl peroxide, tert-butyl hydroperoxide, potassium peroxodiphosphate, tert-butyl peroxo-pivalate, cumene hydroperoxide, isopropylbenzene monohydroperoxide, azobisisobutyronitrile and benzoyl peroxide ($C_{14}H_{10}O_4$).

* * * * *